United States Patent
Matsuda et al.

(10) Patent No.: US 6,756,430 B2
(45) Date of Patent: Jun. 29, 2004

(54) FLAME-RETARDING THERMOPLASTIC RESIN COMPOSITION

(75) Inventors: Yuichi Matsuda, Sodegaura (JP); Mikio Hashimoto, Sodegaura (JP); Ikunori Sakai, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 167 days.

(21) Appl. No.: 09/878,424

(22) Filed: Jun. 12, 2001

(65) Prior Publication Data

US 2002/0013392 A1 Jan. 31, 2002

(30) Foreign Application Priority Data

Jun. 13, 2000 (JP) ........................................ 2000/182329

(51) Int. Cl.$^7$ .................... C08K 5/3492; C08K 5/5399; C08K 5/053; C08K 3/22; C08K 3/26
(52) U.S. Cl. ........................ 524/100; 524/101; 524/138; 524/387; 524/394; 524/416; 524/432; 524/433; 524/436; 524/437; 524/424
(58) Field of Search ................................ 524/100–101, 524/138, 387, 394, 416, 424, 432–433, 436–437

(56) References Cited

U.S. PATENT DOCUMENTS

| | | | |
|---|---|---|---|
| 3,810,862 A | | 5/1974 | Mathis et al. |
| 4,957,950 A | * | 9/1990 | Staendeke et al. .......... 523/205 |
| 5,708,065 A | * | 1/1998 | Martens et al. ............. 524/100 |
| 5,795,930 A | * | 8/1998 | Fukumura et al. .......... 524/100 |
| 6,000,189 A | * | 12/1999 | Breuer et al. .............. 52/649.1 |
| 6,025,423 A | * | 2/2000 | Breant ......................... 524/412 |
| 6,291,068 B1 | * | 9/2001 | Wang et al. ................. 428/403 |
| 6,479,574 B1 | * | 11/2002 | Greigger et al. ............ 524/414 |
| 2002/0010237 A1 | * | 1/2002 | Heinen et al. .............. 524/100 |

FOREIGN PATENT DOCUMENTS

| | | |
|---|---|---|
| JP | 08-176343 A | 7/1996 |
| JP | 10-008058 A | 1/1998 |

OTHER PUBLICATIONS

Chiu S–R et al: "Dynamic flame retardancy of polypropylene filled with ammonium polyphosphate, pentaerythritol and melamine additives" Polymer; Elsevier Science Publishers B.V, GB May 1, 1998.

* cited by examiner

Primary Examiner—Peter Szekely

(57) ABSTRACT

A flame-retarding thermoplastic resin composition which is composed essentially of
  (A) a component of thermoplastic resin,
  (B) a component of nitrogen atom-containing phosphatic compound,
  (C) a component of hydroxyl group-containing compound or partly esterified product thereof and
  (D) a component of neutralizer for acids,
with optional component (E) of triazine derivative or (F) of metal alkoxide, wherein the proportion of each component is such that the component (A) is in the range from 60 to 90 parts by weight, the sum of the components (B)+(C) is in the range from 10 to 40 parts by weight and the component (D) is in the range from 0.1 to 5 parts by weight, per 100 parts by weight of the total sum of (A)+(B)+(C), respectively, wherein the weight ratio of (B)/(C) amounts to at least 1.

33 Claims, No Drawings

FLAME-RETARDING THERMOPLASTIC RESIN COMPOSITION

FIELD OF THE INVENTION

The present invention relates to a flame-retarding thermoplasitc resin composition and to formed articles of flame-retarding resin made therefrom.

BACKGROUND OF THE INVENTION

Resins used in the technical fields of household and office-automation electric apparatuses, automobile parts and so on require a flame-retarding ability for providing for fire accident.

In Japanese Patent Kokai Sho 60-36542 A (corresponding to British Patent No. 2,142,638 A1), a flame-retarding resin composition is disclosed in which ammonium polyphosphate and a polyhydric alcohol are compounded in combination in a plastic resin. However, the polyphosphate blended in the resin composition has insufficient heat resistance and the water-proof ability of the polyhydric alcohol is not satisfactory. Therefore, this resin composition has a problem that it reveals unsatisfactory heat resistance and suffers often from discoloration at higher temperatures causing deterioration of appearance of formed article made therefrom and it has also insufficient water-proof ability resulting sometimes in an inferior appearance of the formed article made therefrom at higher relative humidities due to occurrence of surface bleeding-out.

In Japanese Patent Application Kokai Hei 11-116744 A, a flame-retarding resin composition is disclosed, which is composed of a polyolefin resin, an amine salt of pyrophosphoric acid or a condensed phosphoric acid with an amine having one or more nitrogen atom and a hydroxyl group-containing compound. This flame-retarding resin composition has a problem that the heat resistance of the resin composition is insufficient.

SUMMARY OF THE INVENTION

An object of the present invention is to provide a flame-retarding thermoplastic resin composition superior in the heat resistance and in the water-proof ability, in which a high flame-retarding ability of formed article made therefrom is attained without deteriorating its mechanical properties, even when relatively small amount of flame-retarding additive is incorporated. The flame-retarding resin composition according to the present invention should be capable of producing formed articles exhibiting better appearance without suffering from thermal discoloration and from occurrence of bleeding-out of the blend component, because of its excellent heat resistance and/or water-proof ability. Here, the formed article to be used as a constructional part of electric instrument or apparatus should be able to maintain its electric insulation even at higher temperatures under higher relative humidities and should not emit any noxious gas nor smoke without causing any attack onto metals of the forming and processing apparatuses, by excluding any halogen-containing blend component in the resin composition.

A second object of the present invention is to provide formed articles of flame-retarding resin made from the above-mentioned flame-retarding resin composition.

The present invention resides in the following flame-retarding thermoplastic resin composition and formed articles of flame-retarding resin:

(1) A flame-retarding thermoplastic resin composition comprising (A) a component of thermoplastic resin, (B) a component of nitrogen atom-containing phosphatic compound, (C) a component of hydroxyl group-containing compound or partly esterified product thereof and (D) a component of neutralizer for acids, wherein the proportion of each component is such that the component (A) is in the range from 60 to 90 parts by weight, the sum of the components (B)+(C) is in the range from 10 to 40 parts by weight and the component (D) is in the range from 0.1 to 5 parts by weight, per 100 parts by weight of the total sum of (A)+(B)+(C), respectively, wherein the weight ratio of (B)/(C) amounts to at least 1.

(2) A flame-retarding thermoplastic resin composition comprising (A) a component of thermoplastic resin, (B) a component of nitrogen atom-containing phosphatic compound, (C) a component of hydroxyl group-containing compound or partly esterified product thereof, (D) a component of neutralizer for acids and (E) a component of triazine derivative, wherein the proportion of each component is such that the component (A) is in the range from 60 to 90 parts by weight, the sum of the components (B)+(C) is in the range from 10 to 40 parts by weight, the component (D) is in the range from 0.1 to 5 parts by weight and the component (E) is in the range from 0 to 5 parts by weight, per 100 parts by weight of the total sum of (A)+(B)+(C), respectively, wherein the weight ratio of (B)/(C) amounts to at least 1.

(3) A flame-retarding thermoplastic resin composition comprising (A) a component of thermoplastic resin, (B) a component of nitrogen atom-containing phosphatic compound, (C) a component of hydroxyl group-containing compound or partly esterified product thereof, (D) a component of neutralizer for acids and (F) a component of metal alkoxide, wherein the proportion of each component is such that the component (A) is in the range from 60 to 90 parts by weight, the sum of the components (B)+(C) is in the range from 10 to 40 parts by weight, the component (D) is in the range from 0.1 to 5 parts by weight and the component (F) is in the range from 0.01 to 5 parts by weight, per 100 parts by weight of the total sum of (A)+(B)+(C), respectively, wherein the weight ratio of (B)/(C) amounts to at least 1.

(4) The flame-retarding thermoplastic resin composition as defined in any one of the above (1) to (3), wherein the thermoplastic resin of the component (A) comprises polyolefin resins, polystyrene resin, polyamide resins, polyester resins, polycarbonate resins, polyphenylene ether resins and modified polyphenylene ether resins.

(5) The flame-retarding thermoplastic resin composition as defined in the above (4), wherein the polyolefin resin comprises a polyethylene resin, polypropylene resin, poly-1-butene resin and poly-4-methyl-1-pentene resin.

(6) The flame-retarding thermoplastic resin composition as defined in any one of the above (1) to (5), wherein the nitrogen atom-containing phosphatic compound of the component (B) comprises a melamine pyrophosphate, ammonium polyphosphate and melamine polyphosphate.

(7) The flame-retarding thermoplastic resin composition as defined in any one of the above (1) to (6), wherein the hydroxyl group-containing compound or the partly esterified product thereof of the component (C) comprises pentaerythritol, dipentaerythritol, a partly esterified pentaerythritol and a partly esterified dipentaerythritol.

(8) The flame-retarding thermoplastic resin composition as defined in any one of the above (1) to (7), wherein the neutralizer for acids of component (D) comprises hydrotalcite, metal basic oxides and metal basic hydroxides.

(9) The flame-retarding thermoplastic resin composition as defined in any one of the above (2) and (4) to (8), wherein the triazine derivative of the component (E) comprises melamine and melamine cyanurate.

(10) The flame-retarding thermoplastic resin composition as defined in any one of the ab 3 to 9, wherein the metal alkoxide of the component (F) comprises titaninium alkoxides.

(11) A formed article of flame-retarding resin obtained by subjecting the flame-retarding thermoplastic resin composition as defined in any one of the above (1) to (10) to a forming process.

DETAILED DESCRIPTION OF THE INVENTION

As the thermoplastic resin to be used for the component (A) according to the present invention, any of known ones can be used without any restriction. Concrete examples therefor include polyolefin resins, polysrtyrene resin, polyamide resins, polyester resins, polycarbonate resins, polyphenylene ether resins, modified polyphenylene ether resins, ABS resin and polyoxymethylene resins. Among them, preference is given to polyolefin resins.

As the polyolefin resin to be used for the component (A) according to the present invention, there may be used, for example, homopolymers and copolymers of olefins as well as coplymers of olefins with small proportion of comonomers other than olefin. For the copolymers, they may be either random or block copolymers. Concrete examples of olefin include those having 2–20 carbon atoms, such as ethylene, propylene, 1-butene, 1-pentene, 4-methyl-1-pentene, 1-hexene, 1-octene and 1-decene, wherein preference is given to α-olefins having 2–8 carbon atoms. For other comonomers other than olefin, there may be exemplified vinyl compounds capable of co-polymerizing with α-olefins. These monomers may be used either solely or in combination of two or more of them.

Concrete examples of the polyolefin resin include polyethylene resin, polypropylene resin, poly-1-butene resin and poly-4-methyl-1-pentene resin. Among them, preference is given to polypropylene resin. For the polypropylene resin, there may be enumerated, for example, homopolymer of propylene and random copolymers and block copolymers of propylene with small proportion, e.g. below 10 mole %, of an α-olefin other than propylene.

As the polyester resin to be used for the component (A) according to the present invention, there may be exemplified polyethylene terephthalate and polybutylene terephthalate.

As the polyamide resin to be used for the component (A) according to the present invention, there may be enumerated, for example, nylon 6, nylon 66, nylon 10, nylon 11, nylon 12, nylon 610, nylon 611, nylon 612, polyamide 6T6 and polyamide 6T66.

The thermoplastic resins of the compnent (A) according to the present invention may be used either alone or in a combination of two or more of them.

As the nitrogen atom-containing phosphatic compound (referred to hereinafter sometimes simply as the phosphatic compound) to be used for the component (B) according to the present invention, those phosphatic compounds having at least one nitrogen atom, which are known for use as flame-retarding agent, may be employed without any restriction. For this, there may be recited, for example, phosphates, such as salts of phosphoric acids with ammonia and salts of phosphoric acids with amines; condensation products and polymeric products of them. Other compounds, such as for example, modified phosphatic compounds, in which the above-mentioned phosphatic compounds are superficially coated or are modified with melamine, with melamine resins or with fluorine-containin polymers; and melamine-bridged phosphoric compounds, in which the phosphatic compounds mentioned above are bridges with melamine and are then subjected to a cross-linking treatment, may also be employed.

Concrete examples of the phosphatic compound to be used for the component (B) according to the present invention include ammonium phosphate, melamine pyrophosphate, ammonium polyphosphate and melamine polyphosphate. As others, there may also be employed the phosphatic compound known by Japanese Patent Kokai Hei 11-116744 A. As the phosphatic compounds to be used for the component (B) according to the present invention, preference is given to polyphosphate compounds, such as melamine pyrophosphate, ammonium polyphosphate and melamine polyphosphate.

The phosphatic compounds for the component (B) may be used either alone or in a combination of two or more of them.

As the hydroxyl group-containing compounds for the component (C) according to the present invention, those having at least one hydroxyl group may be used without any restriction, wherein it is favorable to use polyhydric alcohols having at least three, preferably at least four hydroxyl groups. Concrete examples include pentaerythritol, dipentaerythritol, tripentaerythritol, ethylene glycol, propylene glycol, polypentaerythritol, mannitol, sorbitol, polyvinyl alcohol, diphenol, resorcin, hydroquinone, trishydroxyethyl isocyanurate and polytrishydroxyethyl isocyanurate. Further, the hydroxyl group-containing compounds known by Japanese Patent Kokais Hei 11-116744 A and Hei 3-227307 A may also be employed.

As the partly esterified product of hydroxyl group-containing compound (referred to hereafter in some cases simply as the partly esterified product) to be used for the component (C) according to the present invention, there may be exemplified partial esters of the hydroxyl group-containing compounds mentioned above in which a part of the hydroxyl groups in the hydroxyl group-containing compounds are esterified. As the partly esterified product of component (C), there may be used favorably those in which a part of the hydroxyl groups of the polyhydric alcohols having at least three, preferably at least four hydroxyl groups mentioned above is esterified by carboxylic acid.

For the carboxylic acid to be used for the partial esterification, there may be exemplified monocarboxylic acids, such as acetic acid, caproic acid, lauric acid, palmitic acid, stearic acid, behenic acid and benzoic acid; dicarboxylic acids, such as adipic acid, terephthalic acid and isophthalic acid; and tricarboxylic acids, such as pyromellitic acid and so on.

The partly esterified product of component (C) according to the present invention can be obtained by reacting the hydroxyl group-containing compound of component (C) with the carboxylic acid mentioned above by heating. The partly esterified product for (C) may be incorporated in the resin composition according to the present invention as a preliminarily prepared component or may be prepared upon the compounding process for the resin composition by an in situ reaction of the hydroxyl group-containing compound for (C) with a carboxylic acid.

As the hydroxyl group-containing compound or the partly esterified product to be used for the component (C) according to the present invention, there may favorably be incorporated pentaerythritol, dipentaerythritol, partly esterified pentaerythritol and partly esterified dipentaerythritol.

The hydroxyl group-containing compound or the partly esterified product thereof for the component (C) may be used either solely or in a combination of two or more of them. For the case of using two or more of them, a concurrent use of the hydroxyl group-containing compound and the partly esterified product thereof may be permissible.

The neutralizer for acids for the component (D) according to the present invention is an additive to be used for neutralizing the phosphoric acid and/or the polyphosphoric acids liberated from the phosphatic compound for the component (B). Any compound capable of neutralizing such acids may be employed therefor without any restriction. When the phosphatic compound of the component (B) is exposed to a high temperature for a long period of time, phosphoric acid and/or polyphosphoric acids may be brought forth. The neutralizer of the component (D) is incorporated for neutralizing these acids. Concretely explaining, an ammonium polyphosphate used as the phosphatic compound of the component (B) may, when exposed to a high temperature for longer period of time, be subjected to a thermal decomposition leaving polyphosphoric acids under liberation of ammonia. The formed article may suffer from discoloration caused by a possible intramolecular and intermolecular condensation of the polyphosphoric acids formed as above. In order to neutralize the so-formed polyphosphoric acids, the neutralizer for acids for the component (D) is incorporated.

As the neutralizer for acids for the component (D), there may be used, for example, hydrotalcite and basic oxides and basic hydroxides of metals.

Concrete examples of the neutralizer for acids for the component (D) include metal oxides, such as calcium oxide, magnesium oxide, zinc oxide and aluminum oxide; and metal hydroxides, such as magnesium hydroxide, aluminum hydroxide and calcium hydroxide.

It is favorable to use, as the neutralizer for acids for the component (D), hydrotalcite, magnesium oxide, aluminum hydroxide and magnesium hydroxide.

The neutralizers for acids of the component (D) may be used either each alone or in a combination of one or more of them.

While a flame-retarding thermoplastic resin composition superior in the flame-retarding ability can be obtained according to the present invention, even if the component of triazine derivative (E) is not incorporated, a flame-retarding thermoplastic resin composition exhibiting more superior flame-retarding ability can be obtained by incorporating the component of triazine derivative (E).

It is favorable to use, as the triazine derivative for the component (E) according to the present invention, for example, melamine, melamine cyanurate, melam, melem, mellon and melamine resin. Among them, preference is given to melamine and melamine cyanurate.

The triazine derivatives for the component (E) may be used either each alone or in a combination of two or more of them.

While a flame-retarding thermoplastic resin composition superior in the water-proof ability can be obtained according to the present invention, even if the component of metal alkoxide (F) is not incorporated, a flame-retarding thermoplastic resin composition exhibiting more superior water-proof ability can be obtained by incorporating the component of metal alkoxide (F).

As the metal alkoxide for the component (F) to be incorporated according to the present invention, there may be exemplified titanium alkoxides and, concretely, titanium tetraalkoxides, such as titanium tetramethoxide, titanium tetraethoxide, titanium tetraisopropoxide and titanium tetrabutoxide.

The metal alkoxides for the component (F) may be used either each alone or in a combination of two or more of them.

It is permissible to use the triazine derivative for the component (E) and the metal alkoxide for the component (F) concurrently.

The proportion of each component in the resin composition according to the present invention should be such that the component (A) is in the range from 60 to 90 parts by weight, the sum of the components (B)+(C) is in the range from 10 to 40 parts by weight and the component (D) is in the range from 0.1 to 5 parts by weight, per 100 parts by weight of the total sum of (A)+(B)+(C), respectively, wherein the weight ratio of (B)/(C) amounts to at least 1, preferably 1 to 30. Here, it is preferable that the component (A) is in the range from 65 to 85 parts by weight, the sum of the components (B)+(C) is in the range from 15 to 35 parts by weight and the component (D) is in the range from 0.1 to 1 part by weight, per 100 parts by weight of the total sum of (A)+(B)+(C), respectively, wherein the weight ratio of (B)/(C) is in the range from 1 to 5.

In the case of incorporating the component of triazine derivative (E), the proportion of each component in the resin composition according to the present invention should be such that the component (A) is in the range from 60 to 90 parts by weight, the sum of the components (B)+(C) is in the range from 10 to 40 parts by weight, the component (D) is in the range from 0.1 to 5 parts by weight and the component (E) is in the range from 0 to 5, per 100 parts by weight of the total sum of (A)+(B)+(C), respectively, wherein the weight ratio of (B)/(C) amounts to at least 1, preferably 1 to 30. Here, it is preferable that the component (A) is in the range from 65 to 85 parts by weight, the sum of the components (B)+(C) is in the range from 15 to 35 parts by weight, the component (D) is in the range from 0.1 to 1 part by weight and the component (E) is in the range from 0.1 to 2 parts by weight, per 100 parts by weight of the total sum of (A)+(B)+(C), respectively, wherein the weight ratio of (B)/(C) is in the range from 1 to 5.

In the case of incorporating the component of metal alkoxide (F), the proportion of each component in the resin composition according to the present invention should be such that the component (A) is in the range from 60 to 90 parts by weight, the sum of the components (B)+(C) is in the range from 10 to 40 parts by weight, the component (D) is in the range from 0.1 to 5 parts by weight and the component (F) is in the range from 0.01 to 5 parts by weight, per 100 parts by weight of the total sum of (A)+(B)+(C), respectively, wherein the weight ratio of (B)/(C) amounts to at least 1, preferably 1 to 30. Here, it is preferable that the component (A) is in the range from 65 to 85 parts by weight, the sum of the components (B)+(C) is in the range from 15 to 35 parts by weight, the component (D) is in the range from 0.1 to 1 part by weight and the component (F) is in the range from 0.1 to 1 part by weight, per 100 parts by weight of the total sum of (A)+(B)+(C), respectively, wherein the weight ratio of (B)/(C) is in the range from 1 to 5.

Due to the incorporation of the components (B) and (C) in such a proportion that the sum of (B)+(C) is in the range from 10 to 40 parts by weight and the ratio of (B)/(C) is at least 1, it is made possible to impart to the formed article made from such resin composition a superior flame-retarding ability without deteriorating mechanical properties. Further, because of the content of the neutralizer for acid for the component (D) in the range from 0.1 to 5 parts by weight per 100 parts by weight of the total sum of (A)+(B)+(C), the formed articles made from the resin composition according to the present invention is superior in the water-proof ability with simultaneous attainment of prevention of not only the discoloration by heat but also the bleeding-out of blend component and, thus, exhibits superior appearance.

When the triazine derivative (E) is included in the resin composition in a proportion of 5 parts by weight or less per 100 parts by weight of the total sum of (A)+(B)+(C), the resulting resin composition will have a more superior flame-retarding ability.

When the component of metal alkoxide (F) is included in the resin composition in a proportion in the range from 0.01 to 5 parts by weight per 100 parts by weight of the total sum of (A)+(B)+(C), formed articles made therefrom will have a more superior water-proof ability.

The resin composition according to the present invention reveals a superior water-proof ability despite of the incorporation of a hydroxyl group-containing compound, such as a polyhydric alcohol, for the component (C), because bleeding out of the hydroxyl group-containing compound of the component (C) is obstructed by the polar groups based on the nitrogen atom and phosphorus atom in the nitrogen atom-containing phosphatic compound of the component (B). Thus, bleeding-out of the polyhydric alcohol is suppressed even under highly humid conditions, whereby a formed articles exhibiting superior appearance can be obtained. Moreover, when a partly esterified product of a polyhydric alcohol is employed for the component (C), the formed article made from such a resin composition reveals a more superior water-proof ability, since bleeding out of the component (C) is further suppressed by the partial esterification of the hydroxyl groups even under a highly humid condition, so that the resulting formed articles are superior in the appearance.

The resin composition according to the present invention may include, on requirement, other additives, such as filler, lubricant, antioxidant, antistatic agent, UV-absorbing agent and pigments, each in a proportion not obstructing the purpose of the invention, in addition to the components (A) to (F).

The resin composition according to the present invention can be prepared by melt-kneading the constituent ingredients by a known practice. It may be prepared, for example, by melt-kneading the constituent ingredients using a high-speed mixer, such as Henschel mixer, on a single- or double-screw extruder or using a roller mixer.

The resin composition according to the present invention attains a high flame-retarding ability (UL94V, ⅛ inch, V-0) even though the flame-retarding additives are incorporated in a relatively small proportion, wherein mechanical properties are not obstructed due to the lower additive content. The resin composition is also superior in the heat resistance and, thus, thermal discoloration is suppressed. It also reveals a better water-proof performance and, thus, occurrence of bleeding-out of blended component is excluded even under highly humid conditions, whereby formed articles of superior appearance can be obtained therefrom. Further, there occurs no emission of noxious gas or smoke, with exclusion of any corrosive attack on the forming and processing apparatuses.

The resin composition according to the present ionvention can be processed into flame-retarding formed articles by known techniques. There is no special restriction as to the forming technique and any known technique can be employed, such as extrusion molding, injection molding, blow molding, extrusion blow molding, injection blow molding, inflation molding and mold stamping. In accordance with each specific forming technique, extrusion-molded articles, injection-molded articles, blow-molded articles, extrusion blow-molded articles, injection blow-molded articles, inflation-molded articles and mold stamped articles are obtained. Preference is geven to injection molding.

The flame-retarding resin formed articles according to the present invention produced as above can be served conveniently for application fields requiring flame-retardative nature. Thus, it can be used profitably for, for example, household electric instruments and apparatuses, office-automation apparatuses, exterior parts in automobile industry, such as housings etc., and interior elements and furnishings, for instance, parts for electronic devices and instruments, such as connectors and holders for circuit boards.

As described above, the present invention provides a flame-retarding thermoplastic resin composition comprising, as essential ingredients, a component of thermoplastic resin (A), a component of nitrogen atom-containing phosphatic compound (B), a component of hydroxyl group-containing compound or partly esterified product thereof (C) and a component of metal alkoxide (D), which is superior in the heat resistance and in the water-proof ability and which can be processed by any known forming technique into formed articles exhibiting high flame-retarding performance and superior water-proof property without deteriorating mechanical properties and suffering scarcely from occurrence of thermal discoloration and bleeding out of blended component, favoring, thus, the articles with superior appearance. Formed articles for serving for parts of electric devices and apparatuses made from the resin composition according to the present invention maintain their high insulation performances even at higher temperatures and under highly humid conditions. Any emission of noxious gas or smoke is avoided due to exclusion of halogen-containing ingredient. There is no corrosive attack on the processing and forming apparatuses.

When the component of triazine derivative (E) is incorporated additionally in a specific proportion, a more superior flame-retarding performance can be attained. When the component of metal alkoxide (F) is included, a more superior water-proof ability can be attained.

By processing the flame-retarding thermoplastic resin composition according to the present invention by a suitable forming technique, formed articles with superior appearance can be obtained. These articles are superior in the flame-retarding ability and in the mechanical properties and do not suffer from thermal discoloration and from bleeding out of blended component. The formed articles do not emit noxious or hazardus gas and smoke upon incineration.

THE BEST MODE FOR EMBODYING THE INVENTION

Below, the present invention will be described in more detail by way of Examples, wherein such Examples should not be regarded as restricting the invention in any sense.

EXAMPLE 1

A blend of the components as given in Table 1 was melt-kneaded in a double-screw kneading extruder of K.K. Technobel at a temperature of 190° C. The resulting resin composition was processed by injection molding on an injection molding machine of The Japan Steel Works, Ltd. under the condition of a heating temperature of 190° C. and a cooling temperature of 60° C. into a test specimen of a length of 5 inches, a width of ½ inch and a thickness of ⅛ inch. For this test specimen, various tests were carried out, the results of which are recited in Table 1.

EXAMPLES 2 TO 5 AND COMPARATIVE EXAMPLES 1 TO 4

The procedures of Example 1 were puersued except that the blending composition was changed to those given in Table 1. The test results are recited in Table 1.

TABLE 1

| Resin Composition (in wt. part) and Mechanical Properties of Test Specimen | | | | | | | | | |
|---|---|---|---|---|---|---|---|---|---|
| | Example | | | | | Comparative Example | | | |
| | 1 | 2 | 3 | 4 | 5 | 1 | 2 | 3 | 4 |
| J105 *1) | 73 | — | — | — | — | — | — | — | 82 |
| J705 *2) | — | 73 | 73 | 82 | 79 | 82 | 73 | 73 | — |
| Ammonium polyphosphate *3) | — | — | — | 9 | — | 9 | — | — | 9 |
| Melamine pyrophosphate *4) | 18 | 18 | — | — | 16 | — | 18 | — | — |
| Melamine polyphosphate *5) | — | — | 18 | — | — | — | — | 18 | — |
| Pentaerythritol *5) | 9 | — | — | — | 5 | — | — | 9 | 9 |
| P.e. dipentaerythritol *7) | — | 9 | 9 | 9 | — | 9 | 9 | — | — |
| Hydrotalcite *8) | 0.5 | 0.25 | — | 0.5 | 0.5 | 10 | — | — | — |
| Magnesium hydroxide *9) | — | — | 0.25 | — | — | — | — | — | — |
| Phenolic antioxidant *10) | 0.1 | 0.1 | 0.1 | 0.1 | 0.1 | 0.1 | 0.1 | 0.1 | 0.1 |
| Phosphoric antioxidant *11) | 0.2 | 0.2 | 0.2 | 0.2 | 0.2 | 0.2 | 0.2 | 0.2 | 0.2 |
| Calcium stearate | 0.1 | 0.1 | 0.1 | 0.1 | 0.1 | 0.1 | 0.1 | 0.1 | 0.1 |
| Flame-retarding ability *12) | V-0 | V-0 | V-0 | V-0 | V-0 | offgr. | V-0 | V-0 | V-0 |
| Thermal discoloration *13) | | | | | | | | | |
| 120° C. (%) | — | — | — | 3 | — | 2 | — | — | 12 |
| 150° C. (%) | 0.5 | 5 | 5 | — | 0.5 | — | 9 | 10 | — |
| Water-proof ability (I) *14) | O | O | O | O | O | O | O | O | X |
| Water-proof ability (II) *15) | X | X | X | X | X | X | X | X | X |
| Mechanical properties *16) | O | O | O | O | O | O | O | O | O |

Notes in Table 1:
*1): Trademark, a homopolymer of polypropylene: a product of Grand Polymer Co., Ltd. having a melt flow rate of 12 g/10 mm., as determined according to ASTM D 1238 at 230° C. under a load of 2.16 kg.
*2): Trademark, a block copolymer of polypropylene: a product of Grand Polymer Co., Ltd. having a melt flow rate of 12 g/10 mm , as determined according to ASTM D 1238 at 230° C. under a load of 2.16 kg, a propylene content of 88% by weight and a meltiong point of 162° C.
*3): A product of Clariant (Japan) K.K. with trademark AP 422.
*4): A product of the firm Mitsui Kagaku Fine Chemicals, Inc. with trademark PLANELON-NP.
*5): A product of Sanwa Chemical Co.. Ltd. with trademark MPP-A.
*6): A product of Tokyo Kasei Kogyo Co., Ltd.
*7): A partly esterified product of dipentaerythritol: a product of the firm Ajinomoto Fine-Techno Co., Ltd. with trademark ST-210.
*8): A product of Kyowa Chemical Industry Co. , Ltd. with trademark DHT-4A.
*9): A product of Kyowa Chemical Industry Co. , Ltd. with trademark KISUMA 5A.
*10): A product of Ciba Specialty Chemicals K.K. with trademark IRGANOX 1010.
*11): An antioxidant based on phsphorus compound of the firm Ciba Specialty Chemical with trademark IRGAFOS 168.
*12): The flame-retarding ability is determined using the test specimen produced by injection-molding according to UL94V test method. The test specimen is held upright. A mass of cotton wool is placed just below the erected test specimen. The erected specimen is exposed to a flame having a flame length of ¾ inch located beneath the erected specimen for 10 seconds, whereupon the duration of burning of the specimen with selfsustaining flame is determined. The flame-exposure is then repeated again for 10 seconds as soon as the flame of the specimen is extinguished, in order to determine the burning durations with and without selfsustaining flame. In the same procedures, five test specimens are tested. The flame-retarding ability is estimated in three ranks by the following assessment criteria (A) to (E).
V-0: (A) The duration of burning with selfsustaining flame does not exceed 10 seconds for all the tests.
(B) The total sum of the durations of burning with selfsustaining flame for the five tests do not exceed 50 seconds.
(C) The test specimen does not burn with or without selfsustaining flame up to the fixing clamp.
(D) No firing of the cotton wool occurs.

TABLE 1-continued

Resin Composition (in wt. part) and Mechanical Properties of Test Specimen

|  | Example | | | | | Comparative Example | | | |
|---|---|---|---|---|---|---|---|---|---|
|  | 1 | 2 | 3 | 4 | 5 | 1 | 2 | 3 | 4 |

(E) The burning duration without selfsustaining flame after the second flame-exposure does not exceed 30 seconds.
V-1 (A) The duration of burning with selfsustaining flame does not exceed 30 seconds for all the tests.
(B) The total sum of the durations of burning with selfsustaining flame for the five tests do not exceed 250 seconds.
(C) The test specimen does not burn with or without selfsustaining flame up to the fixing clamp.
(D) No firing of the cotton wool occurs.
(E) The burning duration without selfsustaining flame after the second flame-exposure does not exceed 60 seconds.
V-2 (A) The duration of burning with selfsustaining flame does not exceed 30 seconds for all the tests.
(B) The total sum of the durations of burning with selisustaining flame for the five tests do not exceed 250 seconds.
(C) The test specimen does not burn with or without selfsustaining flame up to the fixing clamp.
(D) Firing of the cotton wool may occur.
(E) The burning duration without selfsustaining flame after the second flame-exposure does not exceed 60 seconds.
*13): Resistance to thermal discoloration is evaluated by observing a color difference (ΔE) of the injection molded test specimen on the thermal discoloration test performed by maintaining the specimen under a condition of a high temperature of 120° C. or 150° C. for seven days and the color difference Δ E of the test specimen is determined before and after the heating using SM color computer SM-4 (trademark) of Suga Shikemki K.K., wherein percent change in the color difference ΔE is used as a parameter of the resistance to thermal discoloration.
*14): The water-proof ability (I) is evaluated by organoleptic observation of occurrence of bleeding out of the flame-retarding additives on the injection molded test specimen after having been maintained under a highly humid condition of 80° C. and 90% relative humidity for 48 hours, by finger touch and visual observation of the specimen under a microscope (×200), wherein the evaluation is made in three ranks given below:
○ No rough feel on the finger touch nor separation from the test specimen is observed.
Δ Either one of rough feel on the finger touch and separation from test specimen appears.
X Both rough feel on the finger touch and separation from test specimen are observed.
*15): The water-proof ability (II) is evaluated by observing the volume resistivity of a compression molded test specimen having a thickness of 1 mm after having been maintained under immersion in a hot water of 85° C. for seven days, wherein the evaluation is made in two ranks given below:
○ The volume resistivity observed is at least $10^9$ Ω · cm.
X The volume resistivity observed is not higher than $10^9$ Ω · cm.
*16): Mechanical properties are observed for the injection-molded test specimen by testing procedures according to ASTM at 23° C., wherein the mechanical properties are discriminated in two ranks given below:
○ No deterioration of mechanical properties is found even by incorporation of the flame-retarding additives.
X Deterioration of the mechanical properties is found by incorporation of the flame-retarding additives.

EXAMPLE 6

A blend of the components as given in Table 2 was melt-kneaded on a double-shaft kneading extruder of K.K. Technobel at a temperature of 190° C. The resulting resin composition was processed by injection molding on an injection molding machine of The Japan Steel Works, Ltd. under the condition of a heating temperature of 190° C. and a cooling temperature of 40° C. into test specimens for testing flame-retarding performance and for testing heat resistance. Further, a test specimen for testing water-proof performance was prepared from the above resin composition by compression molding under a condition of a heating temperature of 190° C. and a cooling temperature of 40° C. Using these test specimens, various tests were carried out, the results of which are recited in Table 2.

EXAMPLES 7 TO 10 AND COMPARATIVE EXAMPLES 5 AND 6

The procedures of Example 6 were repeated except that the blending composition was changed to those given in Table 2. The test results are recited in Table 2.

TABLE 2

Resin Composition (in wt. part) and Mechanical Properties of Test Specimen

|  | Example | | | | | Comp. Example | |
|---|---|---|---|---|---|---|---|
|  | 6 | 7 | 8 | 9 | 10 | 5 | 6 |
| J105 *1) | — | 51 | 51 | 51 | 51 | — | 51 |
| J705 *2) | 79 | — | — | — | — | 82 | — |
| S4020 *3) | — | 22 | 22 | 22 | 22 | — | 22 |
| Melamine pyrophosphate *4) | 16 | 18 | 18 | 18 | 18 | 18 | 18 |
| Pentaerythritol *5) | 5 | 9 | 9 | 9 | — | — | 9 |
| P.e. dipenta-erythritol *6) | — | — | — | — | 9 | — | — |
| Hydrotalcite *7) | 0.5 | — | — | — | — | — | — |
| Magnesium hydroxide *8) | — | 0.5 | — | 0.5 | 0.5 | — | — |
| Aluminum hydroxide *9) | — | — | 0.5 | — | — | — | — |
| Melamine *10) | 1 | — | — | — | — | — | — |
| Titanium tetrabutoxide *11) | — | 0.5 | 0.5 | 0.25 | 0.5 | — | 0.5 |
| Phenolic | 0.1 | 0.1 | 0.1 | 0.1 | 0.1 | 0.1 | 0.1 |

TABLE 2-continued

Resin Composition
(in wt. part) and Mechanical Properties of Test Specimen

|  | Example | | | | | Comp. Example | |
| --- | --- | --- | --- | --- | --- | --- | --- |
|  | 6 | 7 | 8 | 9 | 10 | 5 | 6 |
| antioxidant *12) |  |  |  |  |  |  |  |
| Phosphoric antioxidant *13) | 0.2 | 0.2 | 0.2 | 0.2 | 0.2 | 0.2 | 0.2 |
| Calcium stearate | 0.1 | 0.1 | 0.1 | 0.1 | 0.1 | 0.1 | 0.1 |
| Flame-retarding ability *14) | V-0 | V-0 | V-0 | V-0 | V-0 | offgr. | V-0 |
| Thermal discoloration *15) |  |  |  |  |  |  |  |
| 120° C. (%) | — | 1 | 1 | 1 | 1 | 9 | 9 |
| 150° C. (%) | 1 | — | — | — | — | — | — |
| Water-proof ability (I) *16) | ◯ | ◯ | ◯ | ◯ | ◯ | ◯ | ◯ |
| Water-proof ability (II) *17) | X | ◯ | ◯ | ◯ | ◯ | X | X |
| Mechanical properties *18) | ◯ | ◯ | ◯ | ◯ | ◯ | X | ◯ |

Notes in Table 2:
*1): The same as *1) of Table 1.
*2): The same as *2) of Table 1.
*3): An ethylene/propylene copolymer supplied from Mitsui Chemicals, Inc.
*4): The same as *4) of Table 1.
*5): See *6) of Table 1.
*6): See *7) of Table 1.
*7): See *8) of Table 1.
*8): See *9) of Table 1.
*9): A commercial product of Wako Pure Chemical Industries, Ltd.
*10): A commercial product of Tokyo Kasei Kogyo Co., Ltd.
*11): A commercial product of Wako Pure Chemical Industries, Ltd.
*12): See *10) of Table 1.
*13): See *11) of Table 1.
*14): See *12) of Table 1.
*15): See *13) of Table 1.
*16): See *14) of Table 1.
*17): See *15) of Table 1.
*18): See *16) of Table 1.

What is claimed is:

1. A flame-retarding thermoplastic resin composition comprising
(A) a thermoplastic resin,
(B) a nitrogen atom-containing phosphatic compound,
(C) a hydroxyl group-containing compound or partly esterified product thereof and
(D) a at least one neutralizer for acids selected from the group consisting of hydrotalcite, magnesium oxide, aluminum hydroxide and magnesium hydroxide, wherein the proportion of each component is such that the component (A) is in the range from 65 to 85 parts by weight, the sum of the components (B)+(C) is in the range from 15 to 35 parts by weight and the component (D) is in the range from 0.1 to 1 parts by weight, per 100 parts by weight of the total sum of (A)+(B)+(C), respectively, wherein the weight ratio of (B)/(C) amounts to 1–5.

2. A flame-retarding thermoplastic resin composition comprising
(A) a thermoplastic resin,
(B) a nitrogen atom-containing phosphatic compound,
(C) a hydroxyl group-containing compound or partly esterified product thereof,
(D) at least one neutralizer for acids selected from the group consisting of hydrotalcite, magnesium oxide, aluminum hydroxide and magnesium hydroxide, and
(E) at least one triazine derivative selected from the group consisting of melamine, melainine cyanurate, melam, melem, mellon and melamine resin,
wherein the proportion of each of the components (A) to (E) is such that the thermoplastic resin (A) is in the range from 60 to 90 parts by weight, the sum of the components (B)+(C) is in the range from 10 to 40 parts by weight, the component (D) is in the range from 0.1 to 5 parts by weight and the component (E) is present in the range from 0.1 to 5 parts by weight, per 100 parts by weight of the total sum of (A)+(B)+(C), respectively, wherein the weight ratio of (B)/(C) amounts to at least 1.

3. A flame-retarding thermoplastic resin composition comprising
(A) thermoplastic resin,
(B) nitrogen atom-containing phosphatic compound,
(C) hydroxyl group-containing compound or partly esterified product thereof,
(D) neutralizer for acids and
(F) metal alkoxide,
wherein the proportion of each component is such that the component (A) is in the range from 60 to 90 parts by weight, the sum of the components (B)+(C) is in the range from 10 to 40 parts by weight, the component (D) is in the range from 0.1 to 5 parts by weight and the component (F) is in the range from 0.01 to 5 parts by weight, per 100 parts by weight of the total sum of (A)+(B)+(C), respectively, wherein the weight ratio of (B)/(C) amounts to at least 1.

4. The flame-retarding thermoplastic resin composition of claim 1 wherein the thermoplastic resin of the component (A) comprises at least one resin selected from the group consisting of polyolefm resins, polystyrene resins, polyamide resins, polyester resins, polycarbonate resins, polyphenylene ether resins and modified polyphenylene ether resins.

5. The flame-retarding thermoplastic resin composition of claim 4 wherein the polyolefin resin comprises at least one resin selected from the group consisting of a polyethylene resin, polypropylene resin, poly-1-butene resin and poly-4-methyl-1-pentene resin.

6. The flame-retarding thermoplastic resin composition of claim 1 wherein the nitrogen atom-containing phosphatic compound of the component (B) comprises at least one compound selected from the group consisting of a melamine pyrophosphate, anunonium polyphosphate and melamine polyphosphate.

7. The flame-retarding thermoplastic resin composition of claim 4 wherein the nitrogen atom-containing phosphatic compound of the component (B) comprises at least one compound selected from the group consisting of a melamine pyrophosphate, ananonium polyphosphate and melamine polyphosphate.

8. The flame-retarding thermoplastic resin composition of claim 1 wherein the hydroxyl group-containing compound or the partly esterified product thereof of the component (C) comprises at least one compound or partly esterified product thereof selected from the group consisting of pentaerythritol, dipentaerythritol, a partly esterified pentaerythritol and a partly esterified dipentaerythritol.

9. The flame-retarding thermoplastic resin composition of claim 7 wherein the hydroxyl group-containing compound or the partly esterified product thereof of the component (C) comprises at least one compound or partly esterified product thereof selected from the group consisting of pentaerythritol, dipentaerythritol, a partly esterified pentaerythritol and a partly esterified dipentaerythritol.

10. A formed article of flame-retarding resin obtained by subjecting the flame-retarding thermoplastic resin composition of claim 1 to a forming process.

11. A formed article of flame-retarding resin obtained by subjecting the flame-retarding thermoplastic resin composition of claim 9 to a forming process.

12. The flame-retarding thermoplastic resin composition of claim 2 wherein the thermoplastic resin of the component (A) comprises at least one resin selected from the group consisting of polyolefin resins, polystyrene resins, polyamide resins, polyester resins, polycarbonate resins, polyphenylene ether resins and modified polyphenylene ether resins.

13. The flame-retarding thermoplastic resin composition of claim 12 wherein the polyolefin resin comprises at least one resin selected from the group consisting of a polyethylene resin, polypropylene resin, poly-1-butene resin and poly-4-methyl-1-pentene resin.

14. The flame-retarding thermoplastic resin composition of claim 2 wherein the nitrogen atom-containing phosphatic compound of the component (B) comprises at least one compound selected from the group consisting of a melamine pyrophosphate, ammonium polyphosphate and melamine polyphosphate.

15. The flame-retarding thermoplastic resin composition of claim 12 wherein the nitrogen atom-containing phosphatic compound of the component (B) comprises at least one compound selected from the group consisting of a melaniine pyrophosphate, animonium polyphosphate and melamine polyphosphate.

16. The flame-retarding thermoplastic resin composition of claim 2 wherein the hydroxyl group-containing compound or the partly esterified product thereof of the component (C) comprises at least one compound or partly esterified product thereof selected from the group consisting of pentaerythritol, dipentaerythritol, a partly esterified pentaerythritol and a partly esterified dipentaerythritol.

17. The flame-retarding thermoplastic resin composition of claim 15 wherein the hydroxyl group-containing compound or the partly esterified product thereof of the component (C) comprises at least one compound or partly esterified product thereof selected from the group consisting of pentaerythricol, dipentaerythritol, a partly esterified pentaerythritol and a partly esterified dipentaerythritol.

18. The flame-retarding thermoplastic resin composition of claim 2 wherein the triazine derivative of the component (E) comprises at least one compound selected from the group consisting of melamine and melamine cyanurate.

19. The flame-retarding thermoplastic resin composition of claim 17, wherein the triazine derivative of the component (E) comprises at least one compound selected from the group consisting of melamine and melamine cyanurate.

20. A formed article of flame-retarding resin obtained by subjecting the flame-retarding thermoplastic resin composition of claim 2 to a forming process.

21. A formed article of flame-retarding resin obtained by subjecting the flame-retarding thermoplastic resin composition of claim 19 to a forming process.

22. The flame-retarding thermoplastic resin composition of claim 3 wherein the thermoplastic resin of the component (A) comprises at least one resin selected from the group consisting of polyolefin resins, polystyrene resins, polyamide resins, polyester resins, polycarbonate resins, polyphenylene ether resins and modified polyphenylene ether resins.

23. The flame-retarding thermoplastic resin composition of claim 22 wherein the polyolefin resin comprises at least one resin selected from the group consisting of a polyethylene resin, polypropylene resin, poly-1-butene resin and poly-4-methyl-1-pentene resin.

24. The flame-retarding thermoplastic resin composition of claim 3 wherein the nitrogen atom-containing phosphatic compound of the component (B) comprises at least one compound selected from the group consisting of a melamine pyrophosphate, ammonium polyphosphate and melamine polyphosphate.

25. The flame-retarding thermoplastic resin composition of claim 22 wherein the nitrogen atom-containing phosphatic compound of the component (B) comprises at least one compound selected from the group consisting of a melamine pyrophosphate, ammonium polyphosphate and melamine polyphosphate.

26. The flame-retarding thermoplastic resin composition of claim 3 wherein the hydroxyl group-containing compound or the partly esterified product thereof of the component (C) comprises at least one compound or partly esterified product thereof selected from the group consisting of pentaerythritol, dipentaerythritol, a partly esterified pentaerythritol and a partly esterified dipentaerythritol.

27. The flame-retarding thermoplastic resin composition of claim 25 wherein the hydroxyl group-containing compound or the partly esterified product thereof of the component (C) comprise at least one compound or partly esterified product thereof selected from the group consisting of pentaerythritol, dipentaerythritol, a partly esterified pentaerythritol and a partly esterified dipentaerythritol.

28. The flame-retarding thermoplastic resin composition of claim 3 wherein the neutralizer for acids of component (D) comprises at least one neutralizer selected from the group consisting of hydrotalcite, metal basic oxides and metal basic hydroxides.

29. The flame-retarding thermoplastic resin composition of claim 27 wherein the neutralizer for acids of component (D) comprises at least one neutralizer selected from the group consisting of hydrotalcite, metal basic oxides and metal basic hydroxides.

30. The flame-retarding thermoplastic resin composition of claim 3 wherein the metal alkoxide of the component (F) comprises at least one titanium alkoxide.

31. The flame-retarding thermoplastic resin composition of claim 29 wherein the metal alkoxide of the component (F) comprises at least one titanium alkoxide.

32. A formed article of flame-retarding resin obtained by subjecting the flame-retarding thermoplastic resin composition of claim 3 to a forming process.

33. A formed article of flame-retarding resin obtained by subjecting the flame-retarding thermoplastic resin composition of claim 31 to a forming process.

* * * * *